United States Patent Office 3,476,681
Patented Nov. 4, 1969

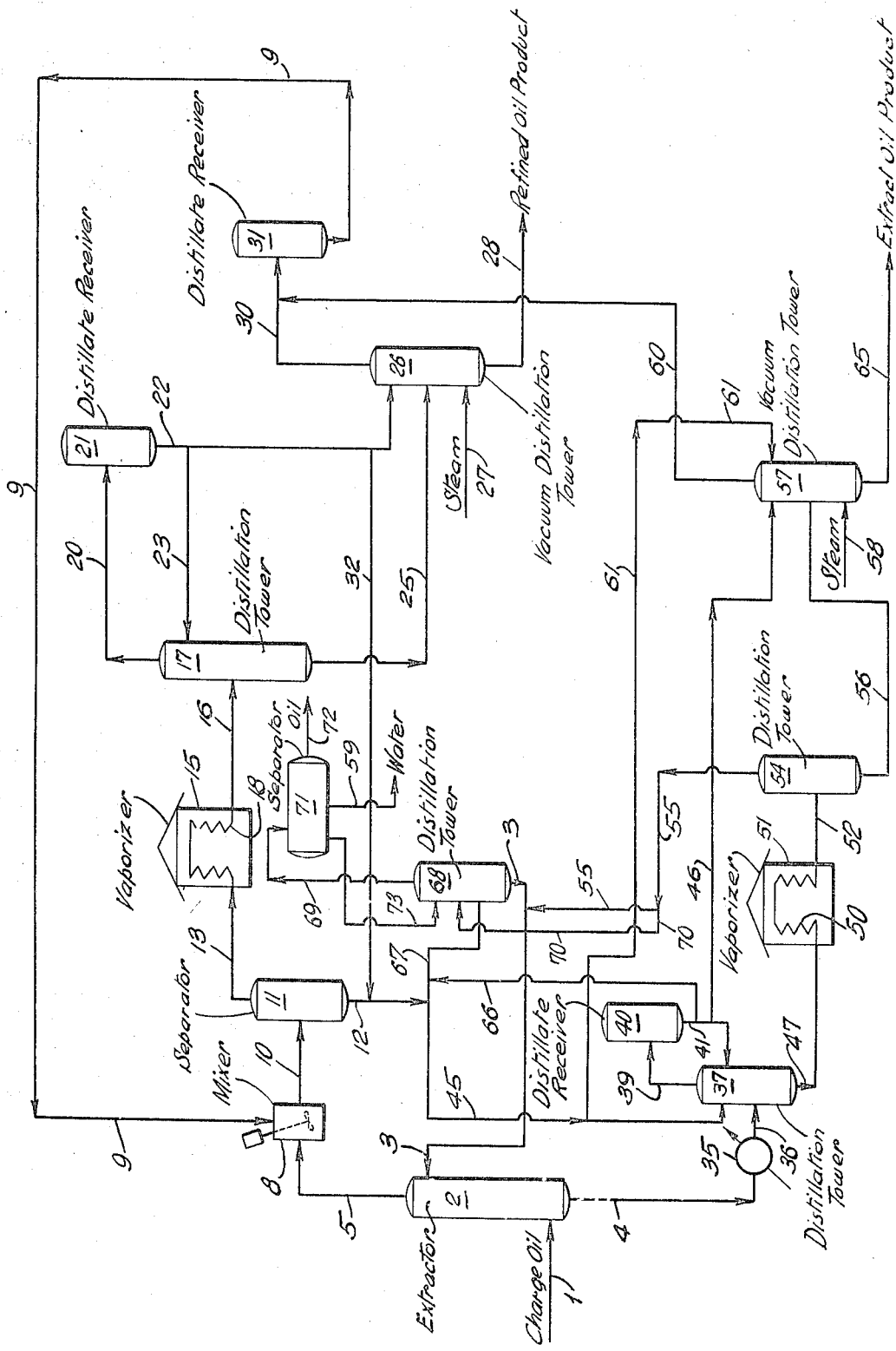

3,476,681
METHOD OF SOLVENT RECOVERY IN REFINING HYDROCARBON MIXTURES WITH N-METHYL-2-PYRROLIDONE
James A. Davies and Philip B. Sherman, Houston, Tex., assignors to Texaco Inc., New York, N.Y., a corporation of Delaware
Filed Dec. 22, 1967, Ser. No. 692,859
Int. Cl. C10g *21/28, 21/14*
U.S. Cl. 208—326            10 Claims

ABSTRACT OF THE DISCLOSURE

A solvent extraction process for refining a hydrocarbon oil with N-methyl-2-pyrrolidone wherein the separation of N-methyl-2-pyrrolidone from the raffinate phase is facilitated by admixing therewith a condensate of water and N-methyl-2-pyrrolidone separated in final stripping of refined oil product and extract oil product.

BACKGROUND OF INVENTION

Field of the invention

Liquid-liquid extraction is used extensively in the petroleum industry to refine hydrocarbon mixtures including lubricating oils, fuels, cracked stocks, and middle distillates. In the solvent extraction process, a solvent is used to separate the petroleum mixtures, which may include both hydrocarbon and non-hydrocarbon constituents, into a raffinate comprising constituents insoluble in the solvent and an extract comprising the constituents dissolved by the solvent. In the case of lubricating oils, solvent extraction is employed to remove more aromatic constituents of the oil and non-hydrocarbon constituents which tend to form deposits or become corrosive in operating equipment. In the processing of cracking stocks, fuels, and middle distillates, solvent extraction is used to separate the more aromatic constituents to provide a refined oil product having improved cracking susceptibility, improved burning characteristics, and improved stability.

The most widely used solvent for many years for such solvent extraction processes in the petroleum industry has been furfural. Recently it has been found that N-methyl-2-pyrrolidone, hereinafter referred to as NMP, is a superior solvent and affords advantages over furfural. In most cases, in substituting NMP for furfural, the solvent dosage is reduced to about half that required with furfural to make an equivalent quality product. Accordingly the solvent turnover is less with NMP than with furfural to produce the same quality of product. Since less solvent is employed, the energy input (pump horsepower, heater duty, etc.) in recovering the solvent in an NMP system is less than with furfural. In addition, fouling of exchangers and vessels is avoided since NMP is not subject to polymerization in the presence of dissolved air or oxygen. NMP has also been found to be significantly less corrosive than furfural. A further significant advantage of NMP is that it forms an ideal mixture with water, that is, it does not form an azeotrope or constant boiling mixture with water, so that mixtures of water and NMP may be completely separated by simple distillation.

Description of the prior art

In the solvent separation of hydrocarbon mixtures with NMP, a raffinate phase is formed comprising constituents insoluble in the solvent together with some dissolved NMP and an extract phase is formed comprising constituents of the hydrocarbon mixture soluble in the NMP and the bulk of the NMP solvent. Separation of the dissolved NMP from the raffinate phase and separation of the dissolved hydrocarbon from the extract phase may be effected by distillation or by re-extraction with a secondary solvent. Secondary solvents which may be used for this purpose include, for example, water or a hydrocarbon of dissimilar boiling range, that is a boiling range wholly outside the boiling range of the NMP and the hydrocarbon mixture charge stock. Details of the NMP solvent refining process and these methods of separation are described in copending, co-assigned applications Ser. No. 604,481 filed Dec. 23, 1966, 624,970 filed Mar. 13, 1967 and 648,533 filed June 20, 1967. In the distillation separation method described in application Ser. No. 604,481, raffinate phase is subjected to initial thermal distillation to separate a major portion of the dissolved solvent from the refined oil and remaining dissolved solvent is separated by distillation with steam at a high vacuum. Solvent is separated from the extract phase by a series of distillation steps including the separation of a major portion of the solvent by thermal distillation and final separation of remaining solvent from the extract product by distillation in the presence of steam under a high vacuum. The present invention is an improvement in the process of said application Ser. No. 604,481 and particularly in the method of separating dissolved NMP from the refined oil or raffinate phase.

SUMMARY OF THE INVENTION

In accordance with this invention condensate from steam stripping of extract and raffinate products is added to the raffinate phase from the primary extraction tower to separate a substantial portion of the NMP solvent from the raffinate and to saturate the remaining oil phase with dissolved water. The effect of this dissolved water is to substantially reduce the temperature required in the thermal distillation of the NMP from the raffinate oil and to permit raising the pressure of the distillation without encountering temperatures which would be harmful to the quality of the raffinate product. As described above, the raffinate phase formed in the solvent refining of a hydrocarbon oil with NMP comprises constituents of the hydrocarbon oil insoluble in the NMP and dissolved NMP. Resulting extract phase comprises the bulk of the NMP solvent, a minor amount of water, and extract oil, the latter comprising the constituents of the hydrocarbon oil soluble in the NMP. A small amount of water is always present in the extract phase as a result of moisture entering the system dissolved or entrained in the feed hydrocarbon, included in the recycled NMP solvent because of incomplete separation of moisture from the system or by the intentional inclusion of a small amount of water to improve solvent selectivity. It is preferred to control the water content of the NMP solvent in the extraction zone at a level of about 1.0 weight percent to achieve maximum selectivity without impairment of solvency.

In accordance with this invention, the raffinate phase from the extraction zone is first contacted with a water stream containing dissolved NMP which stream is produced as condensate from stripping the raffinate oil and extract products with steam. The addition of this water stream effect separation of a solvent phase, comprising a major portion of NMP dissolved in the raffinate phase, from an oil phase of reduced NMP content and increased water content. The resulting wet-oil phase is then thermally distilled separating a major portion of the remaining NMP and the dissolved water as a distillate from bottoms comprising raffinate oil containing a minor residue of NMP. The first distillation zone bottoms is vacuum steam stripped in a second distillation zone effecting separation of remaining traces of NMP from the refined oil product.

The exact phase is distilled in a third distillation zone separating wet NMP as distillate from distillation bottoms comprising NMP and extract oil. The third distillation zone bottoms are distilled in a fourth distillation zone separating dry NMP as distillate from fourth distillation bottoms comprising remaining NMP and extract oil. The fourth distillation bottoms are then distilled under vacuum in the presence of steam in a fifth distillation zone effecting stripping of the remaining NMP from bottoms comprising the extract oil product substantially free of NMP.

The distillate from the fifth distillation zone and the second distillation zone are combined to provide the condensate contacted with the raffinate phase. Advantageously, a portion of the distillate from the first distillation zone is passed as reflux to both the first and second distillation zones. Distillate from the third distillation zone is employed as reflux to the third and fifth distillation zones. The solvent phase separated upon adding the condensate to the raffinate phase may also be employed as a portion of the reflux in the third and fifth distillation zones. Solvent phase not used as reflux as described above is passed to a sixth distillation zone separating water from dry NMP solvent for recycle. In refining oils containing constituents boiling near or coboiling with the NMP solvent, the dry solvent distillate from the fourth distillation zone may contain a small amount of hydrocarbon oil. In this event, it is advantageous to pass as intermediate reflux the fourth distillate to the sixth distillation zone to effect separation of the dissolved oil from fourth zone distillate by means of the water reflux which azeotropes with the oil. The dissolved oil so separated appears in the overhead accumulator drum of the sixth distillation zone and is decanted from the water also passed overhead.

If desired, additional water may be added to the separated oil phase and to the extract phase prior to their distillation to reduce the distillation temperature and increase allowable distillation pressure.

It is advantageous to recycle to the raffinate mix as much vacuum steam stripping condensate as is available up to 50 weight percent water basis the solvent present. By phase equilibrium, and exclusive of entrainment, the amount of water dissolved in the raffinate mix passed to the vaporizer is less than 5 weight percent. The percentage of NMP in the raffinate phase separated by the addition of condensate is between 30 and 85 weight percent.

BRIEF DESCRIPTION OF THE DRAWING AND DESCRIPTION OF A PREFERRED EMBODIMENT

The figure shows a flow diagram illustrative of the process of this invention. Although the drawing is described in connection with the description of a preferred embodiment, it is not intended to limit the invention to the particular material or conditions described.

Charge oil identified as Wax Distillate 7, a lubricating oil charge stock having a gravity of 27.7° API separated by vacuum distillation from the crude oil, is passed at a rate of 417 barrels per hour and at a temperature of 185° F. to extractor 2. The dissolved water content of the charge oil is 430 parts per million. Extractor 2 is a countercurrent contacting device for example a rotating disc contactor wherein the charge oil is countercurrently contacted with NMP solvent introduced at a rate of 625.5 barrels per hour at a temperature of 195° F. through line 3. The NMP solvent stream contains 1.0 weight percent water. Contact of the charge oil and NMP solvent affects extraction of constituents of the charge oil soluble in the NMP from the oil phase, and extract phase product comprising extracted constituents and solvent is withdrawn from the bottom of extractor 2 through line 4 at a temperature of 170° F. The composition of the extract phase is 73.6 weight percent NMP 25.7 weight percent dissolved oil, and 0.7 weight percent dissolved water.

Raffinate phase is withdrawn from the top of extractor 2 through line 5 at a rate of 362 barrels per hour and a temperature of 195° F. The raffinate phase comprises 73.6 weight percent raffinate oil product, 26.1 weight percent dissolved NMP and 0.3 weight percent dissolved water.

Raffinate phase in line 5 is passed to mixer 8 wherein it is mixed with condensate from line 9. The condensate is a mixture of 5,660 pounds per hour of NMP and 5,320 pounds per hour of water and is at a temperature of 101° F. The resulting mixture of raffinate phase and condensate at a temperature of 186° F. is passed through line 10 to separator 11. In separator 11, an aqueous phase comprising 29,571 pounds per hour of NMP, 1,640 pounds per hour of dissolved oil and 3,262 pounds per hour of dissolved water separates and is withdrawn from the bottom of separator 11 through line 12. Oil phase comprising 82,657 pounds per hour of oil, 5,862 pounds per hour of dissolved NMP and 2,363 pounds per hour of dissolved water is separated in the top of separator 11 and withdrawn through line 13. The oil phase in line 13 is passed to heating coil 14 in vaporizer 15 where it is heated to a temperature of 500° F. The resulting vapor-liquid mixture is passed through line 16 to distillation tower 17. Distillate from tower 17 withdrawn through line 20 comprises 4,362 pounds per hour of NMP and 2,265 pounds per hour of water and is passed to distillate receiver 21. Reflux is supplied to distillation tower 17 from receiver 21 through lines 22 and 23. Bottoms from distillation tower 17 comprising 84,297 pounds per hour of oil, 2,110 pounds per hour of dissolved NMP and 97 pounds of dissolved water are withdrawn through line 25 and passed to vacuum distillation tower 26. In vacuum distillation tower 26, steam is introduced through line 27 at a rate of 2,800 pounds per hour stripping the remaining NMP from the refined oil product which is withdrawn through line 28. Refined oil product has a gravity of 32.9° API and it is produced at a rate of 275 barrels per hour, a yield of 66 volume percent basis charge. Distillate comprising 3,280 pounds per hour of NMP and 2,897 pounds per hour of steam is discharged through line 30 to distillate receiver 31.

Extract in line 4 is passed to heat exchanger 35 where the extract and 57 volume percent extract recycle is heated to about 412° F. and then passed through line 36 to distillation tower 37. In distillation tower 37, distillate comprising 93,600 pounds per hour of NMP and 2,028 pounds per hour steam is withdrawn through line 39. Water free bottoms comprising 111,174 pounds per hour of NMP and 71,328 pounds per hour of oil is withdrawn through line 47. The distillate in line 39 is passed to distillate receiver 40. Reflux for distillation tower 37 is withdrawn from receiver 40 through line 41.

The distillation tower bottoms in line 47 is passed to heating coil 50 in vaporizer 51 wherein the temperature is raised to 574° F. The heater effluent is then passed through line 52 to distillation tower 54. In distillation tower 54, the bulk of the remaining NMP is separated as distillate through line 55 comprising 113,714 pounds per hour of dry NMP. This stream is returned via lines 55 and 3 to extractor 2. Bottoms from distillation tower 54 in line 56 comprising 45,390 pounds per hour of oil and 1,563 pounds per hour of NMP are passed to vacuum distillation tower 57. In vacuum distillation tower 57, steam is introduced at a rate of 2,520 pounds per hour through line 58. Extract oil product free of dissolved NMP is withdrawn through line 65 at a rate of 45,390 pounds per hour. Vacuum distillation tower 57 is also refluxed with distillate from receiver 40 through line 46 or water phase from lines 12 and 45 via 61 aggregating some 1,060 pounds per hour of dissolved NMP. The distillate from tower 57 in line 60 comprises 2,625 per hour of NMP and 2,520 pounds per hour of water and is combined with the distillate in line 30 providing the condensate recycled through line 9.

The aqueous solvent phase in line 12 and wet distillate from receiver 40 and line 66 are combined in line 67 and passed to distillation tower 68. In distillation tower 68, water is separated at a rate of 13,775 pounds per hour in the distillate in line 69 and dried solvent for return to extractor 2 is withdrawn from the bottom of tower 68 through line 3 at a rate of 230,933 pounds per hour.

In the specific example described the difference in boiling point of NMP and the constituents of the Wax Distillate 7 is such that no oil tends to accumulate in the dry solvent. However in processing gas oil stocks where the accumulation of coboiling oil in the circulating solvent may be encountered, provision is made for refluxing of the circulating solvent or a slip stream of solvent to the sixth distillation zone. In this case, a portion of the dry solvent in line 55 is withdrawn through line 70, refluxed to distillation tower 68 wherein the coboiling oil and water is separated as azeotrope distillate through line 69 and oil and water free solvent is withdrawn through line 3. Distillate in line 69 is accumulated in separator 71. Water is withdrawn through line 59 and separated oil through line 72. Additional water reflux for tower 68 may be provided by withdrawing water from separator 71 through line 73.

An advantage of the process of this invention is that the process stripping steam required for raffinate and extract vacuum steam stripping is sufficient, when condensed and mixed with the raffinate phase from extraction zone, to separate a solvent phase containing about 80% of the NMP originally dissolved in the raffinate-mix. Furthermore the consumption of fuel in the vaporizing heater employed in the solvent recovery facilities and the size and cost of this vaporizer is appreciably reduced because the NMP so removed by phase separation does not have to be recovered by evaporation in the vaporizers and succeeding distillation zones. Inclusion of the condensate in the raffinate phase adds no additional distillation burden since it is necessary to distill the water away from the NMP in this condensate stream in any event.

A further and unexpected advantage of the addition of condensate to the raffinate phase is that the remaining oil phase is saturated with water. Although this amount of water is relatively small on a weight basis, because of the relatively low molecular weight of steam as compared with the NMP and hydrocarbon being distilled, the dissolved water produces a large amount of steam on a mole fraction basis. The effect of this water on the equilibrium flash distillation permits raising the pressure in the raffinate phase first distillation tower to at least 5 p.s.i.g. thus reducing the diameter and cost of the distillation tower while obtaining the same weight percent vaporization of the NMP. Furthermore, this degree of vaporization is achieved with a lower heater outlet temperature.

We claim:
1. In a process wherein a hydrocarbon oil is contacted with a solvent comprising NMP forming a raffinate phase comprising constituents of said hydrocarbon oil insoluble in said solvent and dissolved NMP and an extract phase comprising said solvent a minor amount of water and extract oil comprising constituents of said hydrocarbon oil soluble in said solvent, the improvement which comprises:
contacting said raffinate phase with a water containing stream as hereinafter provided effecting separation of a solvent phase from an oil phase of reduced NMP content and increased water content,
thermally distilling said oil phase in a first distillation zone separating NMP and dissolved water as a first distillate from first distillation bottoms,
vacuum steam stripping said first distillation bottoms in a second distillation zone separating a second distillate comprising NMP and water from second distillation bottoms comprising refined oil product,
thermally distilling said extract phase in a third distillation zone separating a third distillate comprising NMP and water from third distillation bottoms comprising NMP and said extract oil,
thermally distilling said third distillation bottoms in a fourth distillation separating dry NMP as fourth distillate from fourth distillation bottoms comprising remaining NMP and extract oil,
vacuum steam stripping said fourth distillation bottoms in a fifth distillation zone separating NMP and water as fifth distillate from fifth distillation bottoms comprising extract oil product,
and combining said second distillate and said fifth distillate to provide said water containing stream.

2. The process of claim 1 wherein at least a portion of said first distillate is passed as reflux to said first distillation zone.

3. The process of claim 1 wherein at least a portion of said first distillate is passed as reflux to said second distillation zone.

4. The process of claim 1 wherein at least a portion of said third distillate is passed as reflux to said third distilllation zone.

5. The process of claim 1 wherein at least a portion of said third distillate is passed as reflux to said fifth distillation zone.

6. The process of claim 1 wherein at least a portion of said solvent phase is passed as reflux to said third distillation zone.

7. The process of claim 1 wherein at least a portion of said solvent phase is passed as reflux to said fifth distillation zone.

8. The process of claim 1 wherein at least a portion of said solvent phase is passed to a sixth distillation zone separating water as a sixth distillate from dry NMP separated as sixth distillation bottoms.

9. The prcoess of claim 1 wherein said fourth distillate contains dissolved oil and part or all of said fourth distillate is passed as intermediate reflux to a sixth distillation zone effecting separation of a sixth distillate comprising said dissolved oil and water from sixth distillation bottoms comprising oil-free dry NMP.

10. The process of claim 1 wherein said third distillation bottoms are passed to a vaporizer prior to said fourth distillation zone and water is introduced into the inlet of said vaporizer.

References Cited

UNITED STATES PATENTS

| 2,963,427 | 12/1960 | Nevitt | 208—315 |
| 3,167,501 | 1/1965 | Woodle | 208—321 |
| 3,200,065 | 8/1965 | Cottington | 208—321 |
| 3,306,849 | 2/1967 | Bozeman et al. | 208—314 |

FOREIGN PATENTS 610,414   12/1960   Canada.

HERBERT LEVINE, Primary Examiner

U.S. Cl. X.R.

208—321